United States Patent
Zhou

(10) Patent No.: US 10,403,232 B2
(45) Date of Patent: Sep. 3, 2019

(54) METHOD OF CONTROLLING DISPLAY SCREEN STATES, AND APPARATUS

(71) Applicant: GUANGDONG OPPO MOBILE TELECOMMUNICATIONS CORP., LTD., Dongguan, Guangdong (CN)

(72) Inventor: Yibao Zhou, Dongguan (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 4 days.

(21) Appl. No.: 15/783,334

(22) Filed: Oct. 13, 2017

(65) Prior Publication Data

US 2018/0211634 A1 Jul. 26, 2018

(30) Foreign Application Priority Data

Jan. 20, 2017 (CN) .......................... 2017 1 0047894

(51) Int. Cl.
   *G09G 5/10* (2006.01)
   *G01S 17/02* (2006.01)
   *G06F 1/3231* (2019.01)
   *G06F 1/3234* (2019.01)
   *G06F 3/042* (2006.01)
   *H04W 52/02* (2009.01)

(52) U.S. Cl.
   CPC ............. *G09G 5/10* (2013.01); *G01S 17/026* (2013.01); *G06F 1/3231* (2013.01); *G06F 1/3265* (2013.01); *G06F 3/0421* (2013.01); *H04W 52/0254* (2013.01); *G09G 2360/144* (2013.01)

(58) Field of Classification Search
   CPC .... G01S 17/026; G06F 3/0421; G06F 1/3231; G06F 1/3265; G09G 5/02; G09G 5/10; H04W 52/0254
   See application file for complete search history.

(56) References Cited

U.S. PATENT DOCUMENTS

| | | | |
|---|---|---|---|
| 2008/0122803 A1 | 5/2008 | Izadi et al. | |
| 2010/0295781 A1 | 11/2010 | Alameh et al. | |
| 2012/0019149 A1 | 1/2012 | Shih et al. | |
| 2012/0057858 A1* | 3/2012 | Kobayashi | ............. G03B 17/12 396/439 |

(Continued)

FOREIGN PATENT DOCUMENTS

| CN | 103197357 A | 7/2013 |
|---|---|---|
| CN | 103837174 A | 6/2014 |
| CN | 104811547 A | 7/2015 |

(Continued)

*Primary Examiner* — Sardis F Azongha
(74) *Attorney, Agent, or Firm* — Young Basile Hanlon & MacFarlane P.C.

(57) ABSTRACT

In a method of controlling display screen states and an apparatus, the method includes following actions. A signal emitter emits a detection signal outward. A second signal receiver receives a reflection signal of the detection signal formed by an external object. Based on intensity of the reflection signal received by the second signal receiver, distance states between terminals and the object are determined. The method controls the display screen states based on the distance states. Since the signal receiver away from the signal emitter precisely detects the distance states between terminals and the object, the method controls the display screen states of the terminals.

11 Claims, 14 Drawing Sheets

(56) References Cited

U.S. PATENT DOCUMENTS

2013/0062521 A1  3/2013  Hirayama
2016/0146938 A1  5/2016  Becker et al.

FOREIGN PATENT DOCUMENTS

| CN | 105278669 A | 1/2016 |
| CN | 106020423 A | 10/2016 |
| CN | 106210356 A | 12/2016 |
| CN | 106850982 A | 6/2017 |

\* cited by examiner

METHOD OF CONTROLLING DISPLAY SCREEN STATES, AND APPARATUS

CROSS REFERENCE TO RELATED APPLICATION

This application claims priority to Chinese Patent Application No. 201710047894.3, filed on Jan. 20, 2017 and entitled "METHOD OF CONTROLLING DISPLAY SCREEN STATES, AND APPARATUS," applied by GUANGDONG OPPO MOBILE TELECOMMUNICATIONS CORP., LTD. The entire disclosure of the above application is incorporated herein by reference.

BACKGROUND

Field

The present disclosure relates to a technical field of terminals, and more particularly to a method of controlling display screen states and an apparatus.

Background

With rapid developments of terminal technology, intelligent terminals are more and more popular, and become important devices in lives of people. People learn and are entertained by the intelligent terminals.

Determination of a proximate state or distant state between the intelligent terminals and an external object, for controlling on and off states of display screens of the intelligent terminals, is a necessary function of the intelligent terminals. The intelligent terminals detect the proximate state and distant state between the intelligent terminals using an infrared emitter and an infrared receiver. The infrared emitter emits infrared light, and an object reflects the infrared light to form reflected light. After the infrared receiver receives the reflected light, the proximate state and distant state of the intelligent terminals are determined, based on intensity of the reflected light.

However, in actual use of the intelligent terminals, long distance between the infrared emitter and the infrared receiver causes reception failure of the reflected light to the infrared receiver, when the external object approaches the intelligent terminals. When the infrared emitter and the infrared receiver are too close each other, and the intelligent terminals are far away from the external object, a part of the infrared light emitted by the infrared emitter can directly enter the infrared receiver due to diffraction of the infrared light inside the intelligent terminals, so that the infrared receiver has a large basic value regarding the detection. Since the external object is away from the infrared receiver, little intensity changes of the reflected light can be detected by the infrared receiver after the reflected light enters the infrared receiver. Therefore, sensitivity of the infrared receiver is very low that causes errors or detection omissions, thereby causing an inaccurate control of the on and off states of the display screens of the intelligent terminals.

DETAILED DESCRIPTION OF THE PREFERRED EMBODIMENTS

Figure 1:
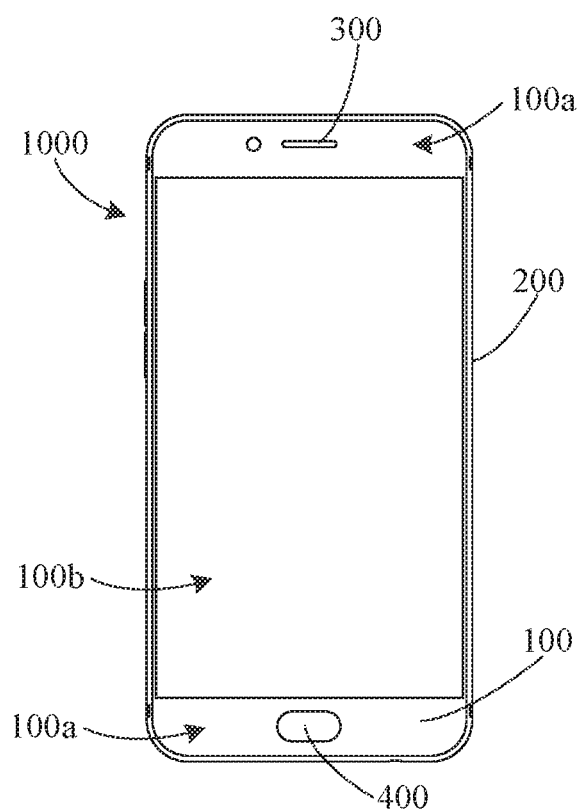
FIG. 1 is an illustrative structural diagram of a mobile terminal according to one embodiment of the present disclosure.

The following embodiments refer to the accompanying drawings for exemplifying specific implementable embodiments of the present disclosure in a suitable computing environment. It should be noted that the exemplary described embodiments are configured to describe and understand the present disclosure, but the present disclosure is not limited thereto.

In the descriptions of the present disclosure, the terms "center", "longitudinal", "lateral", " length", "width", "thickness", "upper", "lower", "front", "back", "left", "right", "vertical", "horizontal", "top", "bottom", "inner", "outer", "clockwise", "counterclockwise" directions, and other indicated directions or the position relation are based on the orientation or position relation shown in the figures. Only for convenience of describing the present disclosure and the simplification of the description, rather than indicating or implying that the means or elements referred to have a specific orientation, so that the above directions of the present disclosure cannot be understood as limitations. In addition, the terms "first" and "second" are used only for purposes of description, and cannot be understood to indicate or imply a relative importance or to implicitly indicate the number of technical features indicated. Thus, the features "first" and "second" can be expressly or implicitly included in one or more of the features. In the description of the present disclosure, the meanings of "multiple" are two or more, unless specifically limited otherwise.

In the descriptions of the present disclosure, it should be noted that unless explicitly stated and defined otherwise, the terms "installing", "connecting", and "connecting" should be construed broadly. For example, the connecting device can be fixedly connected, detachably connected, mechanically connected, electrically connected, in mutual communication with each other, directly connected or indirectly connected through an intermediate medium. The interaction relationship between the two elements in the two elements can be the interaction relationship of the two elements. For a person of ordinary skill in the art, the specific meaning of the terms in the present disclosure can be understood according to specific situations.

In the present disclosure, unless explicitly stated and defined otherwise, the first feature can be in direct contact with the first feature if the first feature is arranged "on" or "under" the second feature. The first and second features may also include first and second features that are not in direct contact but are in contact with each other through additional features. That the first feature is "above" the second feature mean that the first feature is arranged right above or obliquely upward the second feature. Also, only the height of the first feature is greater than that of the second feature. That the first feature is "below" the second feature mean that the first feature is arranged right below or obliquely downward the second feature. Also, only the height of the first feature is less than that of the second feature.

The following disclosure provides many different embodiments or examples for implementing different structures of the present disclosure. In order to simplify the disclosure of the present disclosure, components and arrangements of specific examples are described below. It should be noted that they are merely examples and are not intended to limit the present disclosure. In addition, reference numerals and/or reference letters can be repeated in different examples. The repetition is for the purpose of simplicity and clarity and does not means the relationship between the various embodiments and/or arrangements discussed. In addition, the present disclosure provides examples of various specific processes and materials. The other processes and/or the use of other materials can be recognized by person skilled in the art.

FIG. 1 is an illustrative structural diagram of a mobile terminal 1000 according to one embodiment of the present disclosure. The mobile terminal 1000 is an electronic device, such as a mobile phone or a tablet computer, but the mobile terminal 1000 is not limited thereto.

The mobile terminal 1000 includes a panel assembly 100 and a housing 200. The panel assembly 100 is arranged on and connected with the housing 200. The mobile terminal 1000 further includes a telephone receiver. A non-display region 100a of the panel assembly 100 includes an opening 300 to transmit sound for the telephone receiver. The mobile terminal 1000 further includes a fingerprint identification unit 400. The fingerprint identification unit 400 is arranged on the non-display region 100a of the panel assembly 100. A display region 100b of the panel assembly 100 can be used for displaying images or for user touch operations.

In one embodiment, the panel assembly 100 is one selected from a group consisting of a touch panel assembly, a panel assembly, or a mobile terminal panel assembly having different functions.

Figure 2:
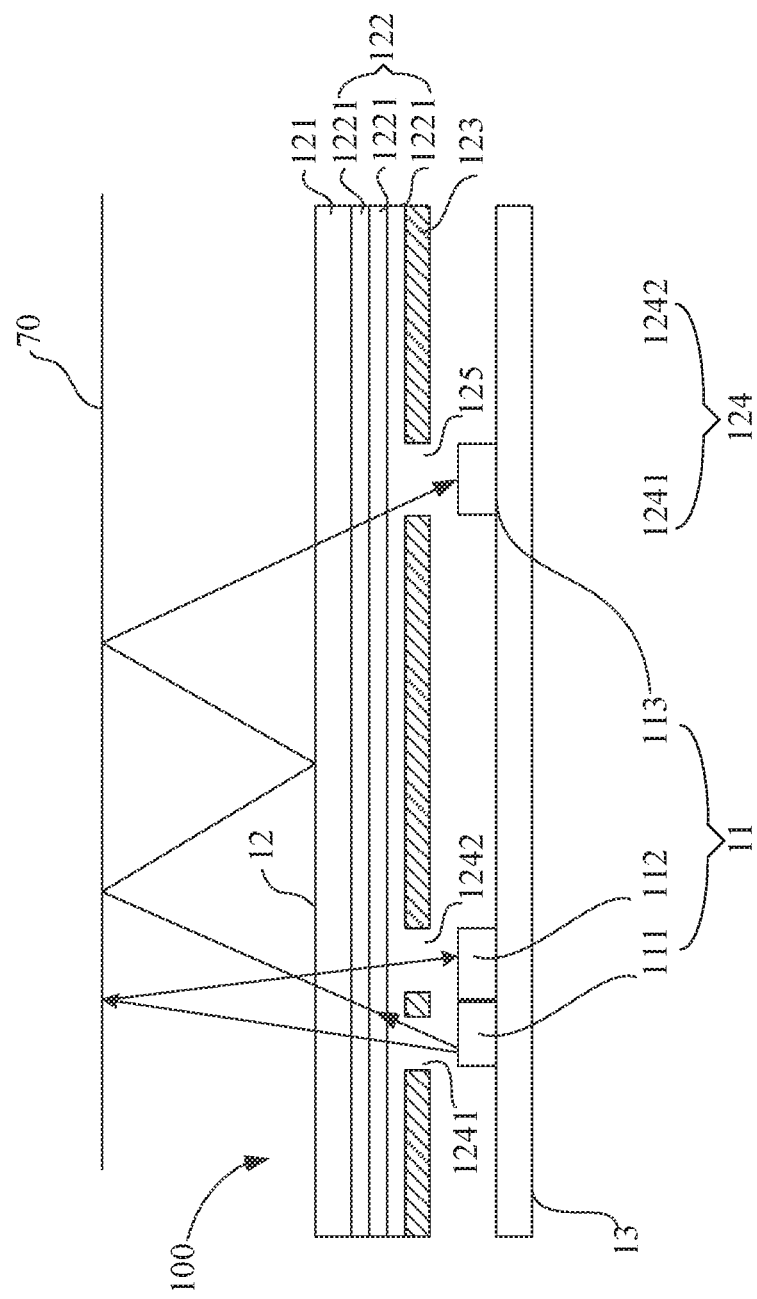
FIG. 2 illustrates a first structural diagram of a panel assembly according to one embodiment of the present disclosure.

FIG. 2 illustrates a first structural diagram of the panel assembly 100 according to one embodiment of the present disclosure. The panel assembly 100 includes a sensor unit 11, a cover plate assembly 12, and a control circuit 13. The sensor unit 11 is arranged on one side of an inner surface of the cover plate assembly 12. The sensor unit 11 and the cover plate assembly 12 are arranged at an interval. The control circuit 13 is in communication with the sensor unit 11 and the cover plate assembly 12. For example, the control circuit 13 is a main circuit board, and the sensor unit 11 is fixedly arranged on the main circuit board.

In one embodiment, the sensor unit 11 includes a first signal emitter 111, a first signal receiver 112, and a second signal receiver 113.

The first signal emitter 111 emits signals outwardly. The first signal receiver 112 and the second signal receiver 113 are configured to receive reflection signals that are reflected by an external object.

In one embodiment, the signals can be light signals, such as infrared rays and lasers. The signals can also be sound wave signals, such as ultrasonic waves. For example, the signals are defined as light signals, the signal emitter is defined as a light emitter, and the signal receiver is defined as a light receiver.

In embodiments of the present disclosure, the first light emitter 111 (e.g., an infrared emitter) is used for emitting detection light, and a wavelength of the detection light is greater than 850 nm. For example, the first light emitter 111 is an infrared light emitting diode (LED).

In one embodiment, the first light receiver 112 (e.g., an infrared receiver) is used for receiving a proximity light signal that is formed by reflecting the detection light off a blocking object 70. For example, the blocking object 70 is defined as a human face in a scene where the mobile terminal is close to or away from the human face in a communication process.

Correspondingly, the second light receiver 113 (e.g., an infrared receiver) is used for receiving a distant light signal that is formed by reflecting the detection light off the blocking object 70.

The proximity light signal means that the first light receiver 112 is close to the first light emitter 111, where the first light receiver 112 receives a reflected detection light from the blocking object 70. The distant light signal means that the second light receiver 113 is away from the first light emitter 111, where the second light receiver 113 receives the reflected detection light from the blocking object 70.

A distance between the first light receiver 112 and the first light emitter 111 is less than a distance between the second light receiver 113 and the first light emitter 111. When the cover plate assembly 12 is away from the blocking object 70, light intensity change detection of the second light receiver 113 is more sensitive. When the cover plate assembly 12 is close to the blocking object 70, the light intensity change detection of the first light receiver 112 is more sensitive. Therefore, the mobile terminal 1000 determines whether the mobile terminal 100 is away from or close to the blocking object 70 based on the light intensity of the reflected detection light that is received by the first light receiver 112 and the second light receiver 113, so that determination accuracy and user experience of the mobile terminal 1000 are improved.

In one embodiment, the first light emitter 111 and the first light receiver 112 can be integrated in a first integrated chip that forms a two-in-one chip. In another embodiment, the first light emitter 111 and the first light receiver 112 are arranged by two separated independent chips.

In one embodiment, the cover plate assembly 12 includes a cover plate 121, a first attachment layer 122 on an inner surface of the cover plate 121, and a second attachment layer 123 that is arranged on a surface of the first attachment layer 122 and away from the cover plate 121. The first attachment layer 122 completely covers the second attachment layer 123, where the first attachment layer 122 and the second attachment layer 123 form an attachment layer.

In one embodiment, the first attachment layer 122 and the second attachment layer 123 are configured to achieve the effect of hiding internal structural members and the second attachment layer 123 of the mobile terminal 1000. In other words, when viewing an outer side of the cover plate 121, the user only sees the first attachment layer 122, and cannot view the second attachment layer 123.

In one embodiment, the cover plate 121 is a transparent glass cover plate. For example, the cover plate 121 is a glass cover plate made of a material, such as sapphire and the like.

In one embodiment, the attachment layer can be an ink layer or a coating that is formed by other materials. For example, the attachment layer is an ink layer, the first attachment layer is a light-transmitting ink layer, and the second attachment layer is a light-shading ink layer.

In one embodiment, the light-transmitting ink layer 122 is a transparent ink layer for transmitting the light. Light transmittance of the ink layer can be set according to different requirements. For example, the transmittance of visible light (e.g., visible light having a wavelength of 550 nm) of the light-transmitting ink layer 122 has a range from 2% to 10%. The transmittance of the light signal (e.g., infrared rays having a wavelength of 850 nm) of a proximity sensor is greater than or equal to 80%.

In one embodiment, the light-transmitting ink layer 122 includes a plurality of layers of light-transmitting ink sub-layers 1221. For example, the light-transmitting ink layer 122 includes three light-transmitting ink sub-layers 1221, where each of the light-transmitting ink sub-layers 1221 is formed by spraying or printing white ink. It should be noted that the light-transmitting ink layer 122 can be designed into other colors according to different aesthetic requirements besides the white ink.

In one embodiment, the light-shading ink layer 123 is an ink layer capable of shading light and shields most of light rays. The light-shading ink layer 123 is formed by spraying or printing black ink. The light-shielding ink layer 123 includes a first region and a second region. Transmission rate of the first region to light rays is greater than that of the second region to the light rays. For example, the first region is a light transmitting area and transmits most of the light rays. The second region is a light shielding area and shields most of the light rays.

The light-transmitting ink layer 122 covers the first region on the light-shielding ink layer 123.

The transmission rate of the light-transmitting ink layer 122 to the light rays is greater than that of the light-shielding ink layer 123.

In embodiments, the transmission rate is selected from one group consisting of a transmission rate of infrared rays, a transmission rate of lasers, and a transmission rate of visible light.

In embodiments, a first light through-hole 124 and a second light through-hole 125 are formed on the light-shielding ink layer 123 and transmit light. The first light through-hole 124 and the second light through-hole 125 is defined as the first region. An area outside the first light through-hole 124 and the second light through-hole 125 in the light-shielding ink layer 123 is defined as the second region. It should be noted that the first light through-hole 124 and the second light through-hole 125 can also be filled with light-transmitting material, where color of the light-transmitting material is the same as color of the light-transmitting ink layer 122. The first light through-hole 124 includes a first light-emitting hole 1241 and a first light-receiving hole 1242. The first light emitter 111 is arranged opposite the first light-emitting hole 1241, and outwardly emits the detection light by the first light-emitting hole 1241. The first light receiver 112 is arranged opposite the first light-receiving hole 1242, and receives reflected detection light by the first light-receiving hole 1242.

In one embodiment, the second light through-hole 125 is arranged opposite the second light receiver 113, and the second light receiver 113 receives reflected detection light by the second light through-hole 125.

Shapes of the first light-emitting hole 1241, the first light-receiving hole 1242, and the second light through-hole 125 can be set according to actual requirements. For example, the shapes are selected from one group consisting of a circle, a rectangle, and a rounded rectangle. In one embodiments, for increasing the capability of receiving light signals by the first light receiver 112 and the second light receiver 113, and for improving sensitivity of the sensor, an opening area of the first light-receiving hole 1242 and an opening area of the second light through-hole 125 are larger than an opening area of the first light-emitting hole 1241.

Figure 3:
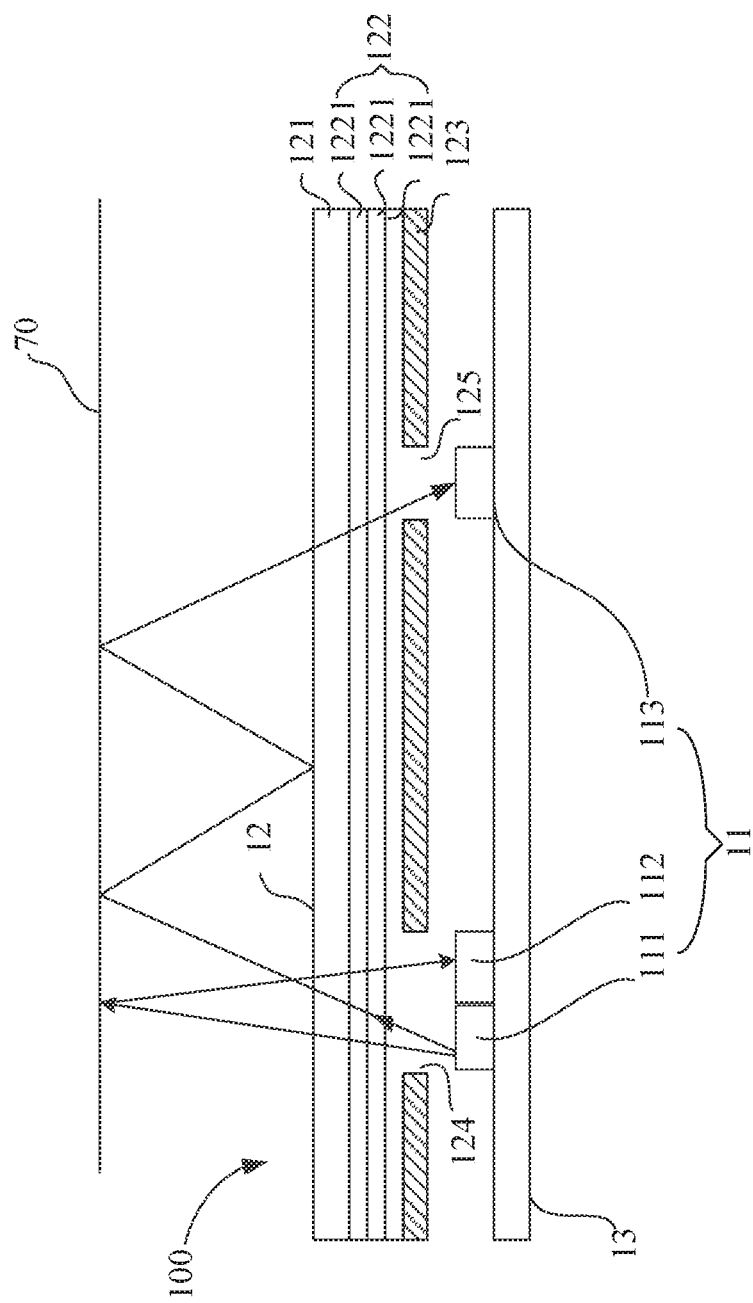
FIG. 3 illustrates a second structural diagram of the panel assembly according to one embodiment of the present disclosure.

In one embodiment, as shown in FIG. 3, the first light through-hole 124 is a larger hole, where the larger hole is used by the first light emitter 111 and the first light receiver 112.

In one embodiment, the control circuit 13 is in communication with the first light emitter 111, the first light receiver 112, and the second light receiver 113. The first light emitter 111, the first light receiver 112, and the second light receiver 113 are all fixedly arranged on the main circuit board.

For example, when a mobile phone uses the panel assembly 100, the distance between the first light receiver 112 and the first light emitter 111 is different from the distance between the second light receiver 113 and the first light emitter 111, where the first light receiver 112 is close to the first light emitter 111. When the panel assembly 100 is close to the blocking object 70, and the second light receiver 113 is away from the first light emitter 111, therefore, the second light receiver 113 receives smaller reflected light and the light intensity changes are little variation along with distance changes. When the panel assembly 100 is away from the blocking object 70 and the reflected light is small, the light that is emitted by the first light emitter 111 directly enters the first light receiver 112 by an internal reflection and thus, the first light receiver 112 receives a large basic value of the light intensity. Furthermore, since the cover plate assembly 12 is away from the blocking object 70 and the light intensity of the reflected light is smaller, the light intensity changes of the reflected light that is received by the first light receiver 112 are not obvious. Moreover, since the distance between the second light receiver 113 and the first light emitter 111 is greater than the distance between the first light receiver 112 and the first light emitter 111, light emission of the first light emitter 111 that is reflected into the second light receiver 113 by the internal reflection is smaller, so that a basic value of the light intensity of the second light receiver 113 by the internal reflection is small. Therefore, the light intensity change of the reflected light that enters the second light receiver 113 is relatively large.

In a communication process of the mobile phone, the control circuit 13 controls the first light emitter 111 that emits the detection light, and determines whether the mobile terminal installed with the panel assembly 100 is close to or away from the human face according to the light intensity of the reflected light that are received by the first light receiver 112 and the second light receiver 113. When the determination is that the mobile terminal is away from the human face, the cover plate assembly 12 is controlled and the display screen is turned on. When the determination is that the mobile terminal is close to the human face, the cover plate assembly 12 is controlled and the display screen is turned off.

When the light intensity that is received by the first light receiver 112 reaches a first proximity threshold, or when the light intensity that is received by the second light receiver reaches a second proximity threshold, a determination is that the mobile terminal is close to the human face. When the light intensity that is received by the first light receiver 112 reaches a first distant threshold, and when the light intensity that is received by the second light receiver 113 reaches a second distant threshold, the determination is that the mobile terminal is away from the human face.

Figure 4:
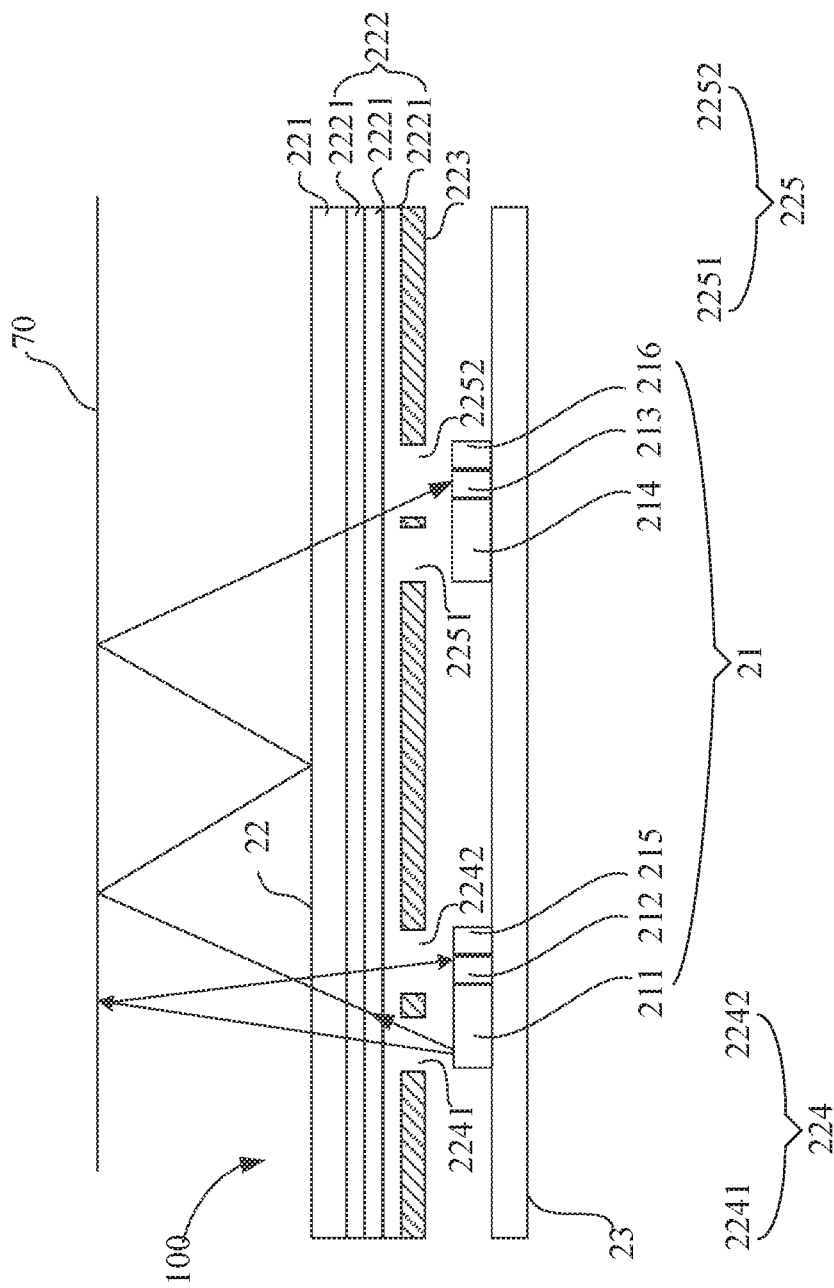
FIG. 4 illustrates a third structural diagram of the panel assembly according to one embodiment of the present disclosure.

FIG. 4 illustrates a third structural diagram of the panel assembly 100 according to one embodiment of the present disclosure. The panel assembly 100 includes a sensor unit 21, a cover plate assembly 22, and a control circuit 23. The sensor unit 21 is arranged on one side of an inner surface of the cover plate assembly 22. The sensor unit 21 and the cover plate assembly 22 are arranged at an interval. The control circuit 23 is in communication with the sensor unit 21 and the cover plate assembly 22. For example, the control circuit 23 is a main circuit board, and the sensor unit 21 is fixedly arranged on the main circuit board.

The sensor unit 21 includes a first light emitter 211, a first light receiver 212, a second light receiver 213, a second light emitter 214, a first ambient brightness sensor 215, and a second ambient brightness sensor 216.

In one embodiment, the sensor unit 21 includes a circuit board. The first light emitter 211, the first light receiver 212, the second light receiver 213, the second light emitter 214, the first ambient brightness sensor 215, and the second ambient brightness sensor 216 are arranged on the circuit board.

In one embodiment, the first light emitter 211 and the second light emitter 214 are used for emitting invisible light (e.g., infrared light) of which the wavelength is larger than 850 nm.

In one embodiment, the first light emitter 211 and the second light emitter 214 are infrared light emitters. The first light receiver 212 and the second light receiver 213 are infrared light receivers. The first light receiver 212 is used for receiving a proximity light signal that is formed by reflecting the detection light off a blocking object. The second light receiver 213 is used for receiving a distant light signal that is formed by reflecting the detection light off the blocking object. A distance between the first light receiver 212 and the first light emitter 211 is smaller than a distance between the second light receiver 213 and the first light emitter 211. The proximity light signal means that the first light receiver 212 is close to the first light emitter 211, where the first light receiver 212 receives a reflected detection light from the blocking object. The distant light signal means that the second light receiver 213 is away from the first light emitter 211, where the second light receiver 213 receives the reflected detection light from the blocking object.

The distance between the first light receiver 212 and the first light emitter 211 is smaller than the distance between the second light receiver 213 and the first light emitter 211. Therefore, when the first light emitter 211 serves as a detection light emitter, and when the panel assembly 100 is away from the blocking object, the light intensity change detection of the second light receiver 213 is more sensitive. When the panel assembly 100 is close to the blocking object, the light intensity change detection of the first light receiver 212 is more sensitive. When the second light emitter 214 serves as a detection light emitter, and when the panel assembly 100 is away from the blocking object, the light intensity change detection of the first light receiver 212 is more sensitive. When the panel assembly 100 is close to the blocking object, the light intensity change detection of the second light receiver 213 is more sensitive.

In one embodiment, the control circuit 23 selects one of the first light emitter 211 and the second light emitter 214 as a detection light emitter. Generally, the first light emitter 211 serves as an emitter of the detection light, and when the control circuit 23 detects that the first light emitter 211 is abnormal or damaged, the second light emitter 214 serves as a detection light emitter.

In embodiments, the first light emitter 211, the first light receiver 212 and the first ambient brightness the sensor 215 can be integrated into an integrated chip that forms a three-in-one chip. The second light emitter 214, the second light receiver 213, and the second ambient brightness sensor 216 can be integrated into the other integrated chip that forms another three-in-one chip.

Figure 5:
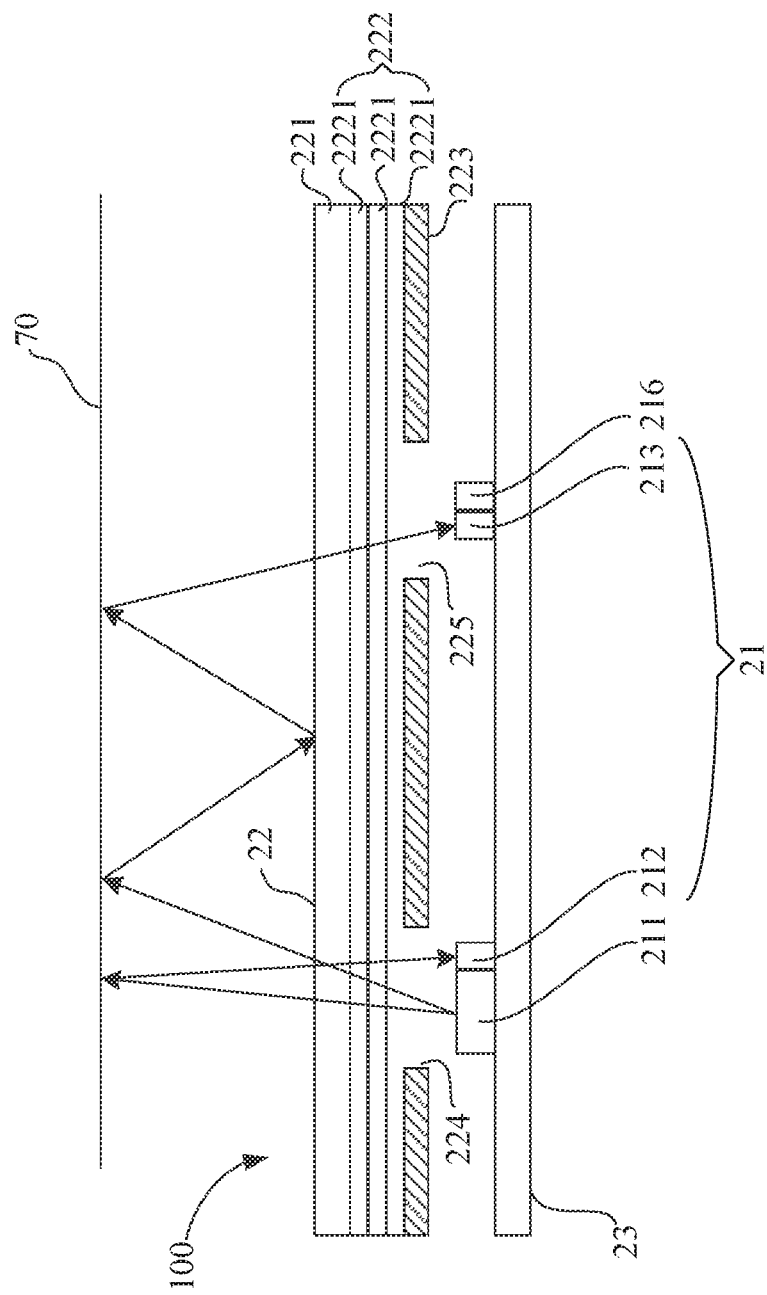
FIG. 5 illustrates a fourth structural diagram of the panel assembly according to one embodiment of the present disclosure.

In embodiments, as shown in FIG. 5, the sensor unit 21 includes a first light emitter 211, a first light receiver 212, a second light receiver 213, and a second ambient brightness sensor 216. The first light emitter 211, the first light receiver 212, the second light receiver 213, and the second ambient brightness sensor 216 are arranged on the circuit board.

In one embodiment, the first light emitter 211 and the first light receiver 212 can be integrated in an integrated chip that forms a two-in-one chip. In another embodiment, the second light receiver 213 and the second ambient brightness sensor 216 can be integrated in another integrated chip that forms another two-in-one chip. The two two-in-one chips are arranged on the circuit board at an interval.

A distance between the two two-in-one chips has a range from 2 millimeters to 12 millimeters. The distance is the distance between the geometric centers of the two two-in-one chips.

In one embodiment, the cover plate assembly 22 includes a cover plate 221, a light-transmitting ink layer 222 on an inner surface of the cover plate 221, and a light-shading ink layer 223 that is arranged on a surface of the light-transmitting ink layer 222 and is away from the cover plate 221. The light-transmitting ink layer 222 and the light-shading ink layer 223 form an ink layer.

In one embodiment, the light-transmitting ink layer 222 includes a plurality of layers of light-transmitting ink sub-layers 2221. For example, the light-transmitting ink layer 222 includes three light-transmitting ink sub-layers 2221, where each of the light-transmitting ink sub-layers 2221 is formed by spraying or printing white ink. It should be noted that the light-transmitting ink layer 222 can be designed into other colors according to different aesthetic requirements besides the white ink.

In one embodiment, the light-shading ink layer 223 can be formed by spraying or printing black ink. A first light through-hole 224 and a second light through-hole 225 are formed in the light-shielding ink layer 223.

In one embodiment, the light-transmitting ink layer 22 on the light-shading ink layer 223 is a transparent ink layer. Light transmittance of the ink layer can be set according to different requirements. For example, the transmittance of visible light (e.g., visible light having a wavelength of 550 nm) of the light-transmitting ink layer 222 has a range from 2% to 10%. The transmittance of the light signal (e.g., infrared rays having a wavelength of 850 nm) of a proximity sensor is greater than or equal to 80%.

As shown in FIG. 4, the first light through-hole 224 includes a first light emitting hole 2241 and a first light receiving hole 2242. The first light emitter 211 is opposite the first light emitting hole 2241, and emits detection light outward through the first light emitting hole 2241. The first light receiver 212 and the first ambient brightness sensor 215 are opposite the first light receiving hole 2242. The first light receiver 212 receives reflected light of the detection light through the first light receiving hole 2242. The first ambient brightness sensor 215 detects ambient light intensity through the first light receiving hole 2242.

As shown in FIG. 4, the second light through-hole 225 includes a second light emitting hole 2251 and a second light receiving hole 2252. The second light emitter 214 is opposite the second light emitting hole 2251, and emits detection light outward through the second light emitting hole 2251. The second light receiver 213 and the second ambient brightness sensor 216 are opposite the second light receiving hole 2252. The second light receiver 212 receives reflected light of the detection light through the second light receiving hole 2252. The second ambient brightness sensor 216 detects ambient light intensity through the second light receiving hole 2252.

Figure 6:
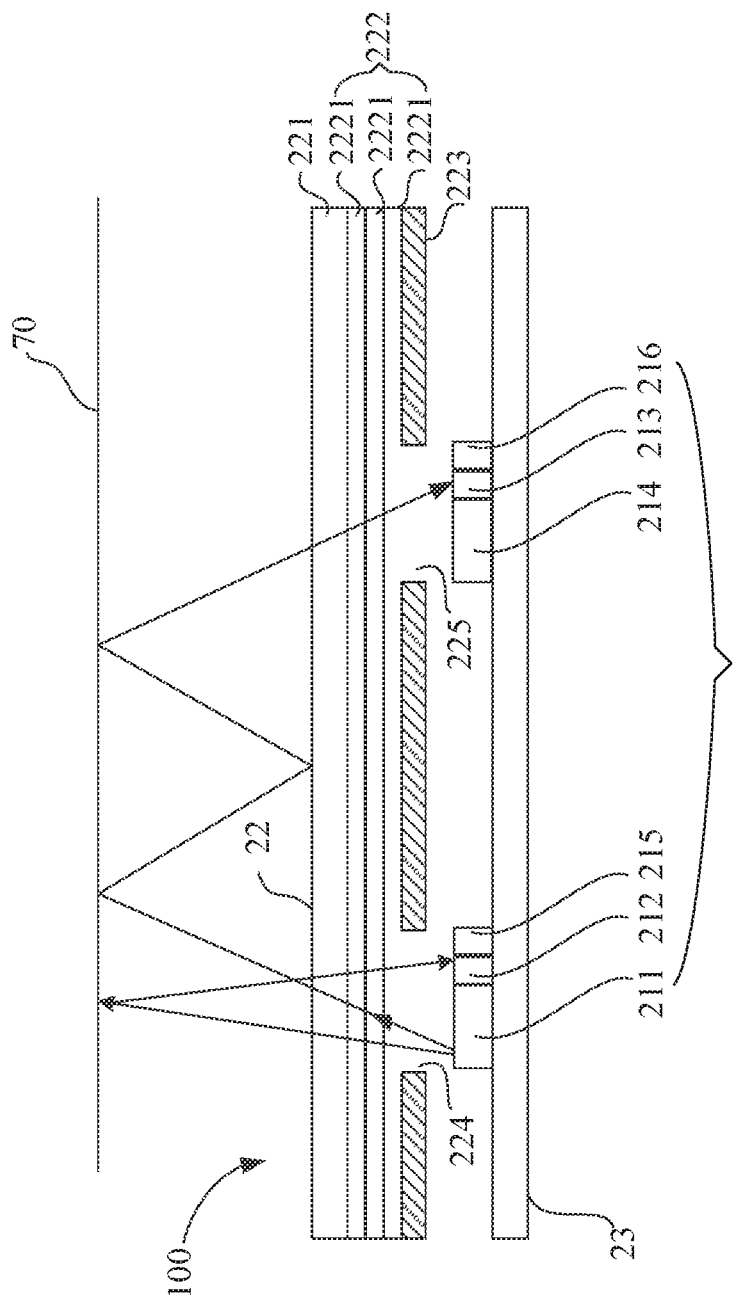
FIG. 6 illustrates a fifth structural diagram of the panel assembly according to one embodiment of the present disclosure.

In one embodiment, as shown in FIG. 6, the first light through-hole 224 is a larger hole, where the larger hole is used by the first light emitter 211, the first light receiver 212, and the first ambient brightness sensor 215.

In one embodiment, the second light through-hole 225 is a larger hole, where the larger hole is used by the second light emitter 214, the second light receiver 213, and the second ambient brightness sensor 216.

For example, when a mobile phone uses the panel assembly 100, the control circuit 23 selects the first light emitter 211 as a detection light emitter, and the second light emitter 214 is idle.

Figure 7:
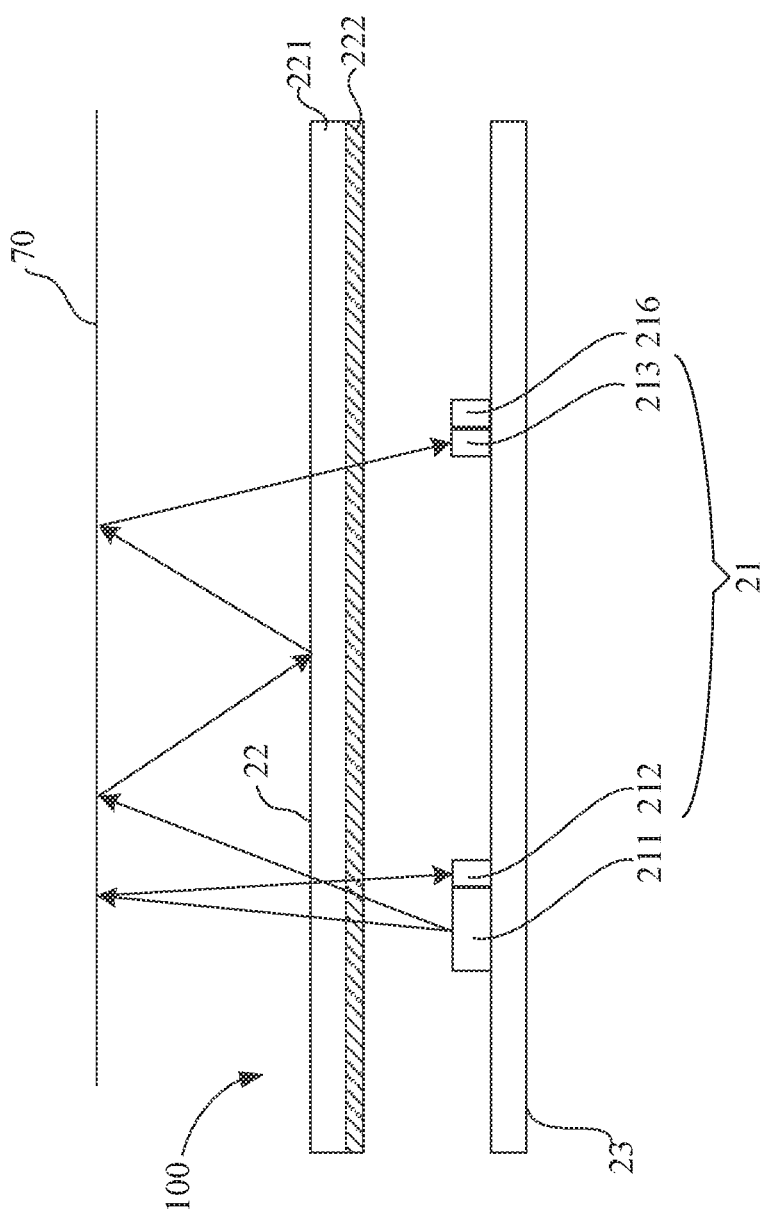
FIG. 7 illustrates a sixth structural diagram of the panel assembly according to one embodiment of the present disclosure.

In one embodiment, as shown in FIG. 7, the cover plate assembly 22 only includes a cover plate 221 and a light-transmitting ink layer 222 arranged on an inner surface of the cover plate 221.

In one embodiment, the light-transmitting ink layer 222 is formed by spraying or printing specific ink. For example, the specific ink can be infrared ink (IR ink). Transmittance of the IR ink to the infrared rays is greater than or equal to 80%, and therefore most infrared rays can pass through the light-transmitting ink layer 222. The appearance of the IR ink is black ink.

A functional region may be formed on the light-transmitting ink layer 222 at a position corresponding to the second ambient brightness sensor 216. An ink capable of allowing the ambient light to penetrate through is sprayed or printed in the functional region. The functional region is used for enabling ambient light to pass, so that the second ambient brightness sensor 216 can detect the ambient brightness.

Embodiments of the present disclosure further relate to a method of controlling display screen states. The method of controlling display screen states controls states of the display screen according to distance states between the terminal and an external object. The distance states include a distant state and a proximate state. The display screen states includes on and off states.

Methods of controlling display screen states include a method of turning on the display screen and a method of turning off the display screen. The method of turning on the display screen is configured to turn on the display screen of the terminal when the terminal and the external object are at the distant state. The method of turning off the display screen is configured to turn off the display screen of the terminal when the terminal and the external object are at the proximate state.

Figure 8:
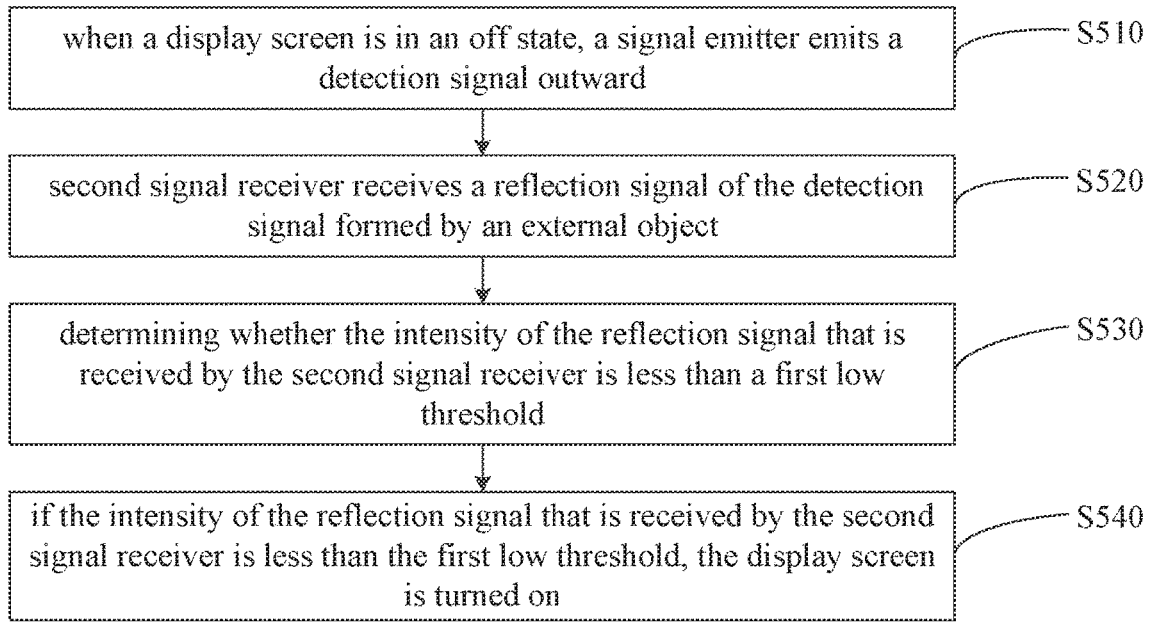
FIG. 8 is an illustrative flowchart of a method of turning on a display screen according to one embodiment of the present disclosure.

As shown in FIG. 8, the method of turning on the display screen includes following action blocks.

At block S510, when a display screen is in an off state, a signal emitter emits a detection signal outward.

The terminal includes the display screen. When the display screen of the terminal is in the off state, the terminal controls the signal emitter for emitting the detection signal outward. For example, in a communication process, the terminal is close to the face of a user while the display screen of the terminal is in the off state, and the terminal controls the signal emitter to emit the detection signal outward.

At block S520, a second signal receiver receives a reflection signal of the detection signal formed by an external object.

In one embodiment, when the detection signal emitted by the signal emitter is in contact with the external object, the external object reflects the detection signal to form a reflection signal. The second signal receiver continuously receives the reflection signal. The second signal receiver is a signal receiver which is away from the signal emitter.

At block S530, the method determines whether the intensity of the reflection signal that is received by the second signal receiver is less than a first low threshold.

In one embodiment, a low threshold and a high threshold are set in the terminal for the second signal receiver. The low threshold is the first low threshold. The low threshold and the high threshold can be signal intensity values. Based on different types of the second signal receivers, the low threshold and the high threshold can be different. For example, when the second signal receiver is an 8-bit receiving chip, the low threshold is 75, and the high threshold is 256 (e.g., a receiving range of the chip).

After the second signal receiver receives the reflection signal, the terminal compares the received reflection signal intensity with the low threshold, so as to determine whether the intensity of the reflection signal is less than the low threshold.

At block S540, if the intensity of the reflection signal that is received by the second signal receiver is less than the first low threshold, the display screen is turned on.

When the terminal determines that the intensity of the reflection signal received by the second signal receiver is less than the first low threshold, the terminal determines that the external object is away from the terminal. In other words, the terminal and the external object are at the distant state, so that the display screen of the terminal is turned on.

Figure 9:
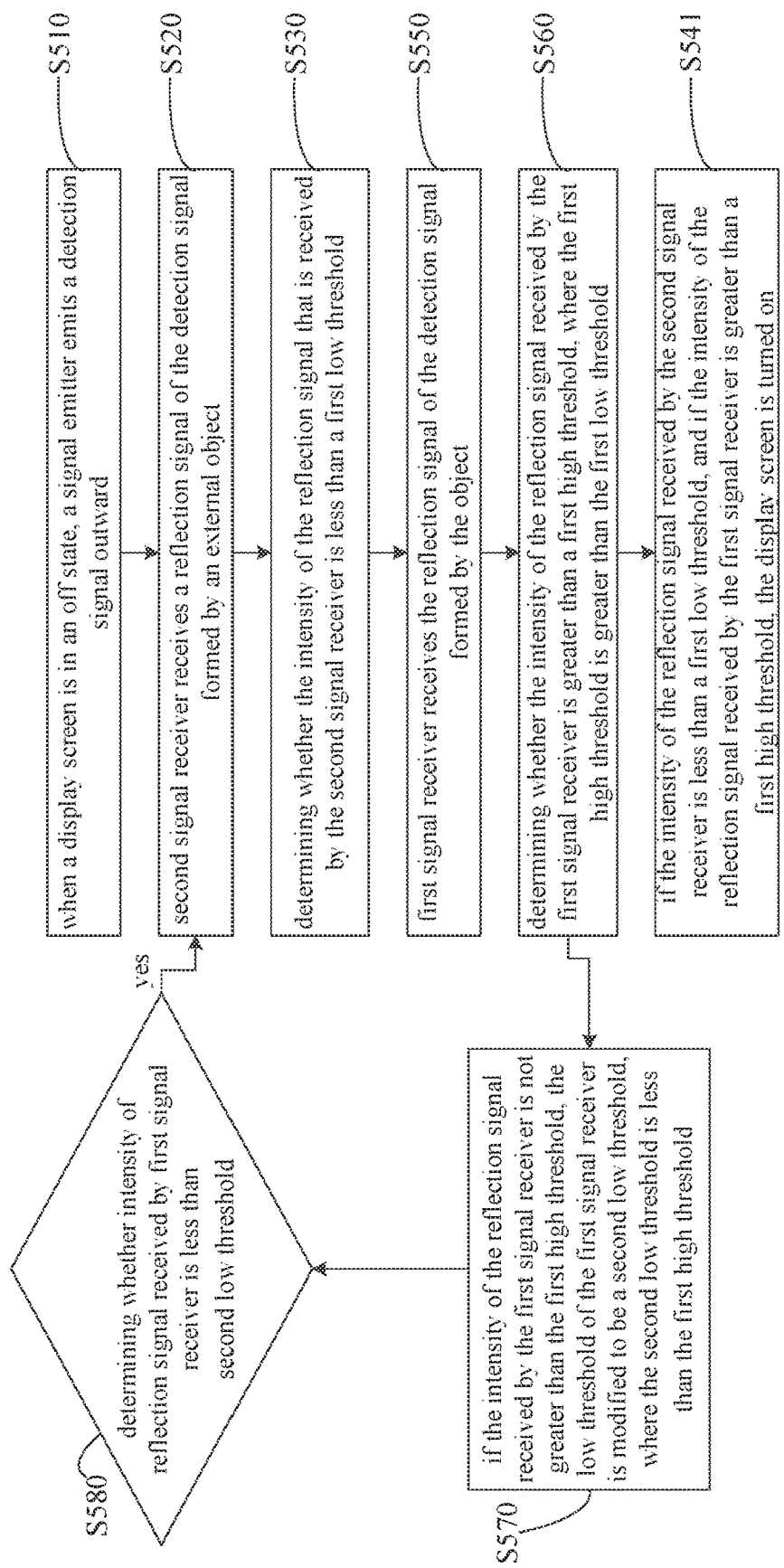
FIG. 9 is an illustrative flowchart of a method of turning on the display screen according to another embodiment of the present disclosure.

As shown in FIG. 9, if the intensity of the reflection signal is less than the first low threshold, and before the display screen is turned on, the method of turning on the display screen further includes following action blocks.

At block S550, the first signal receiver receives the reflection signal of the detection signal formed by the object.

At block S560, the action block determines whether the intensity of the reflection signal received by the first signal receiver is greater than a first high threshold, where the first high threshold is greater than the first low threshold.

When the detection signal emitted by the signal emitter is in contact with the external object, the external object reflects the detection signal to form a reflection signal. The first signal receiver continuously receives the reflection signal. The first signal receiver is a signal receiver which is close to the signal emitter.

Since the distance between the first signal receiver and the signal emitter is different from the distance between the second signal receiver and the signal emitter, and after the detection signal emitted by the signal emitter are reflected by the same external object, therefore, the intensity of the reflection signal received by the first signal receiver is different from the intensity of the reflection signal received by the second signal receiver.

In one embodiment, a low threshold and a high threshold are set in the terminal for the first signal receiver. The high threshold is the first high threshold. The first high threshold is greater than the first low threshold. The low threshold and the high threshold can be signal intensity values. Based on different types of the first signal receivers, the low threshold and the high threshold can be different. When the first signal receiver is an 8-bit receiving chip, the low threshold is zero, and the high threshold is 80.

After the first signal receiver receives the reflection signal, the terminal compares the received reflection signal intensity with the high threshold, so as to determine whether the intensity of the reflection signal is greater than the high threshold.

In embodiments, if the intensity of the reflection signal is less than the first low threshold, the action block of turning on the display screen includes following action blocks.

At block S541, if the intensity of the reflection signal received by the second signal receiver is less than a first low threshold, and if the intensity of the reflection signal received by the first signal receiver is greater than a first high threshold, the display screen is turned on.

The terminal compares the intensity of the reflection signal received by the second signal receiver with the first low threshold, and compares the intensity of the reflection signal received by the first signal receiver with the first high threshold. When the intensity of the reflection signal received by the second signal receiver is less than the first low threshold, and when the intensity of the reflection signal received by the first signal receiver is greater than the first high threshold, the terminal determines that the external object is away from the terminal, so that the display screen of the terminal is turned on.

For example, when the intensity (e.g., 60) of the reflection signal received by the second signal receiver is less than the first low threshold (e.g., 75), and when the intensity (e.g., 90) of the reflection signal received by the first signal receiver is greater than the first high threshold (e.g., 80), the terminal controls the display screen of the terminal and turns on the display screen.

In embodiments, after determining whether the intensity of the reflection signal received by the first signal receiver is greater than a first high threshold, the method of turning on the display screen further including following action blocks.

At block S570, if the intensity of the reflection signal received by the first signal receiver is not greater than the first high threshold, the low threshold of the first signal receiver is modified to be a second low threshold, where the second low threshold is less than the first high threshold.

At block S580, this action determines whether the intensity of the reflection signal received by the first signal receiver is less than the second low threshold.

If the intensity of the reflection signal received by the first signal receiver is less than the second low threshold, the first signal receiver and the second signal receiver is used for receiving a reflection signal that is formed by reflecting the detection light off an external object again.

When the terminal determines that the intensity of the reflection signal received by the first signal receiver is not greater than (i.e., less than or equal to) the first high threshold, the terminal modifies a high threshold and a low threshold of the first signal receiver. The modified low threshold is a second low threshold. The modified low threshold is less than the first high threshold.

For example, when the terminal determines that the intensity of the reflection signal received by the first signal receiver is not greater than the first high threshold, the terminal modifies the low threshold of the first signal receiver from zero to 60 and modifies the high threshold of the first signal receiver from 80 to 120.

Afterwards, the terminal determines whether the intensity of the reflection signal received by the first signal receiver is less than the second low threshold. If the intensity of the reflection signal is less than the second low threshold, the first signal receiver and the second signal receiver receive a reflection signal that is formed by reflecting the detection light off an external object again. The terminal performs determination again after receiving the reflection signal. In other words, the terminal performs action blocks S520, S530, S550, and S560.

Figure 10:
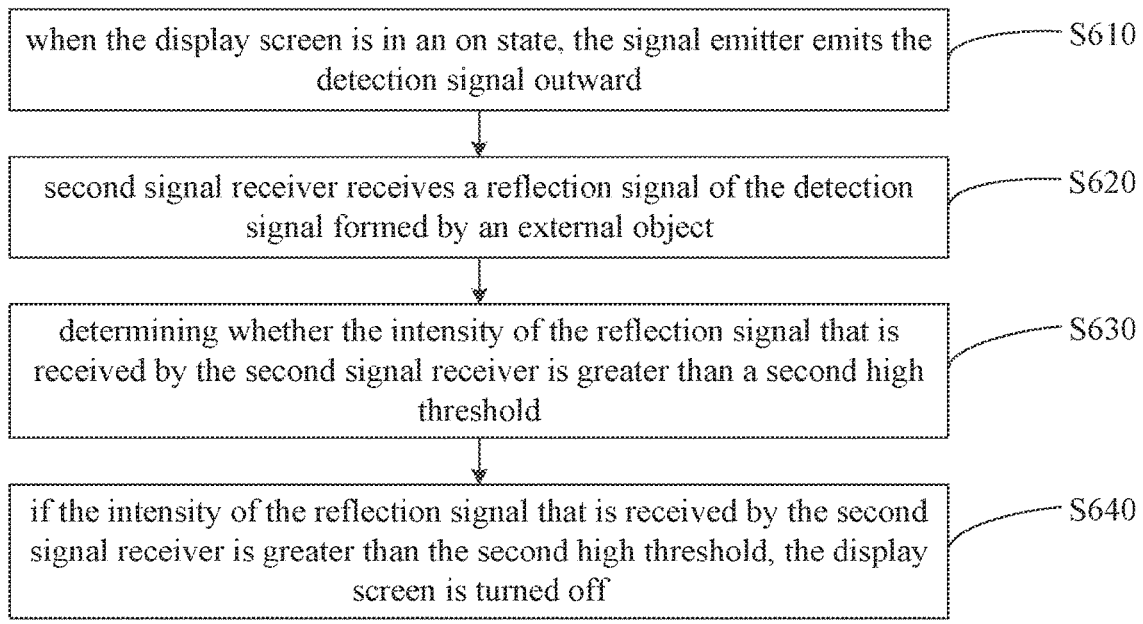
FIG. 10 is an illustrative flowchart of a method of turning off the display screen according to one embodiment of the present disclosure.

As shown in FIG. 10, a method of turning off the display screen includes following action blocks.

At block S610, when the display screen is in an on state, the signal emitter emits the detection signal outward.

The terminal includes the display screen. When the display screen of the terminal is in the on state, the terminal controls the signal emitter for emitting the detection signal outward. For example, in a communication process, the terminal is not close to the face of a user while the display screen of the terminal is in the on state, and the terminal controls the signal emitter to emit the detection signal outward.

At block S620, a second signal receiver receives a reflection signal of the detection signal formed by an external object.

When the detection signal emitted by the signal emitter is in contact with the external object, the external object reflects the detection signal to form a reflection signal. The second signal receiver continuously receives the reflection signal. The second signal receiver is a signal receiver which is away from the signal emitter.

At block S630, the method determines whether the intensity of the reflection signal that is received by the second signal receiver is greater than a second high threshold.

In one embodiment, a low threshold and a high threshold are set in the terminal for the second signal receiver. The high threshold is the second high threshold. The low threshold and the high threshold can be signal intensity values. Based on different types of the second signal receivers, the low threshold and the high threshold can be different. For example, when the second signal receiver is an 8-bit receiving chip, the low threshold is zero, and the high threshold is 100.

After the second signal receiver receives the reflection signal, the terminal compares the received reflection signal intensity with the high threshold, so as to determine whether the intensity of the reflection signal is greater than the high threshold.

At block S640, if the intensity of the reflection signal that is received by the second signal receiver is greater than the second high threshold, the display screen is turned off.

When the terminal determines that the intensity of the reflection signal received by the second signal receiver is greater than the high threshold (e.g., the second high threshold), the terminal determines that the external object is close to the terminal. In other words, the terminal and the external object are at a proximate state, so that the display screen of the terminal is turned off.

Embodiments of the present disclosure further relate to an apparatus of controlling display screen states. The apparatus of controlling display screen states controls states of the display screen according to distance states between the terminal and an external object. The distance states include a distant state and a proximate state. The display screen states include an on state and an off state.

Apparatuses of controlling display screen states include an apparatus of turning on the display screen and an apparatus of turning off the display screen. The apparatus of turning on the display screen is configured to turn on the display screen of the terminal when the terminal and the external object are at the distant state. The apparatus of turning off the display screen is configured to turn off the display screen of the terminal when the terminal and the external object are at the proximate state.

Figure 11:
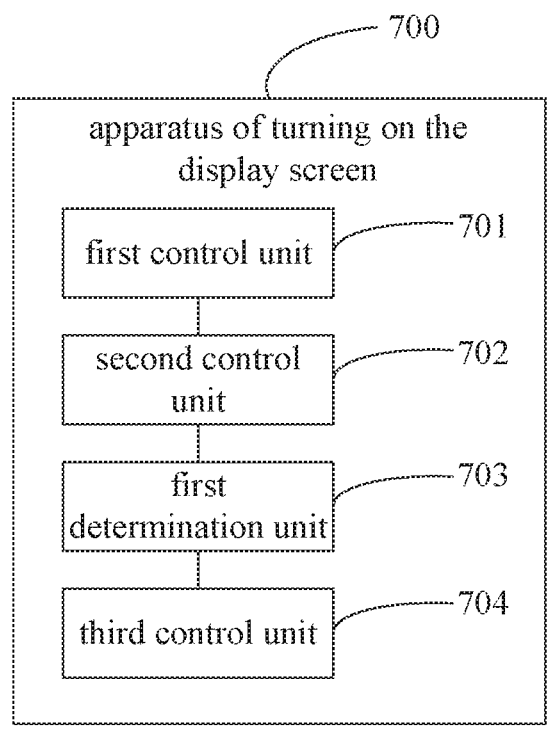
FIG. 11 is an illustrative structural diagram of a control apparatus of turning on the display screen according to one embodiment of the present disclosure.

As shown in FIG. 11, the apparatus 700 of turning on the display screen includes a first control unit 701, a second control unit 702, a first determination unit 703, and a third control unit 704.

The first control unit 701 is configured to control a signal emitter that emits a detection signal outward when a display screen is in an off state.

The terminal includes the display screen. When the display screen of the terminal is in the off state, the first control unit 701 controls the signal emitter for emitting the detection signal outward. For example, in a communication process, the terminal is close to the face of a user while the display screen of the terminal is in the off state, and the first control unit 701 controls the signal emitter to emit the detection signal outward.

The second control unit 702 is configured to control a second signal receiver that receives a reflection signal of the detection signal formed by an external obj ect.

In one embodiment, when the detection signal emitted by the signal emitter is in contact with the external object, the external object reflects the detection signal to form a reflection signal. The second control unit 702 controls the second signal receiver that continuously receives the reflection signal. The second signal receiver is a signal receiver which is away from the signal emitter.

The first determination unit 703 is configured to determine whether the intensity of the reflection signal that is received by the second signal receiver is less than a first low threshold.

In one embodiment, a low threshold and a high threshold are set in the terminal for the second signal receiver. The low threshold is the first low threshold. The low threshold and the high threshold can be signal intensity values. Based on different types of the second signal receivers, the low threshold and the high threshold can be different. For example, when the second signal receiver is an 8-bit receiving chip, the low threshold is 75, and the high threshold is 256 (e.g., a receiving range of the chip).

After the second signal receiver receives the reflection signal, the first determination unit 703 compares the received reflection signal intensity with the low threshold, so as to determine whether the intensity of the reflection signal is less than the low threshold.

The third control unit 704 is configured to control the display screen and turn s on the display screen if the intensity of the reflection signal that is received by the second signal receiver is less than the first low threshold.

When the first determination unit 703 determines that the intensity of the reflection signal received by the second signal receiver is less than the first low threshold, the terminal determines that the external object is away from the terminal. In other words, the terminal and the external are at the distant state, so that the third control unit 704 controls the display screen of the terminal and turns on the display screen.

Figure 12:
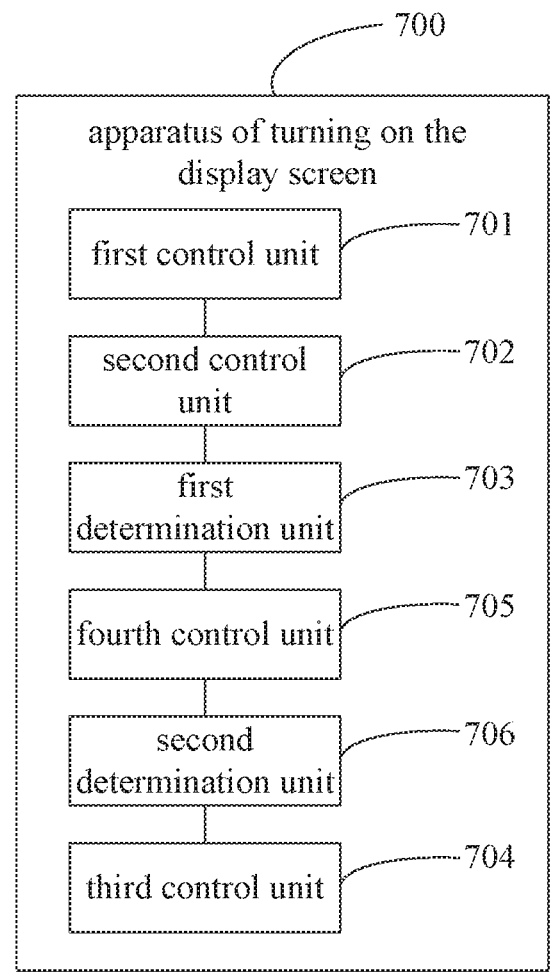
FIG. 12 is yet another illustrative structural diagram of the control apparatus of turning on the display screen according to another embodiment of the present disclosure.

In embodiments, as shown in FIG. 12, the apparatus 700 of turning on the display screen further includes a fourth control unit 705 and a second determination unit 706.

The fourth control unit 705 is configured to control the first signal receiver that receives the reflection signal of the detection signal formed by the object.

The second determination unit 706 is configured to determine whether the intensity of the reflection signal received by the first signal receiver is greater than a first high threshold, where the first high threshold is greater than the first low threshold.

When the detection signal emitted by the signal emitter is in contact with the external object, the external object reflects the detection signal to form a reflection signal. The fourth control unit 705 controls the first signal receiver continuously that receives the reflection signal. The first signal receiver is a signal receiver which is close to the signal emitter.

Since the distance between the first signal receiver and the signal emitter is different from the distance between the second signal receiver and the signal emitter, and after the detection signal emitted by the signal emitter are reflected by the same external object, therefore, the intensity of the reflection signal received by the first signal receiver is different from the intensity of the reflection signal received by the second signal receiver.

In one embodiment, a low threshold and a high threshold are set in the terminal for the first signal receiver. The high threshold is the first high threshold. The first high threshold is greater than the first low threshold. The low threshold and the high threshold can be signal intensity values. Based on different types of the first signal receivers, the low threshold and the high threshold can be different. When the first signal receiver is an 8-bit receiving chip, the low threshold is zero, and the high threshold is 80.

After the first signal receiver receives the reflection signal, the second determination unit 706 compares the received reflection signal intensity with the high threshold, so as to determine whether the intensity of the reflection signal is greater than the high threshold.

In embodiments, the third control unit 704 performs following operations.

If the intensity of the reflection signal received by the second signal receiver is less than a first low threshold, and if the intensity of the reflection signal received by the first signal receiver is greater than a first high threshold, the display screen is turned on.

The first determination unit 703 compares the intensity of the reflection signal received by the second signal receiver with the first low threshold, and the second determination unit 706 compares the intensity of the reflection signal received by the first signal receiver with the first high threshold. When the intensity of the reflection signal received by the second signal receiver is less than the first low threshold, and when the intensity of the reflection signal received by the first signal receiver is greater than the first high threshold, the terminal determines that the external object is away from the terminal, so that the third control unit 704 controls the display screen of the terminal and turns on the display screen.

For example, when the intensity (e.g., 60) of the reflection signal received by the second signal receiver is less than the first low threshold (e.g., 75), and when the intensity (e.g., 90) of the reflection signal received by the first signal receiver is greater than the first high threshold (e.g., 80), the third control unit 704 controls the display screen of the terminal and turns on the display screen.

Figure 13:
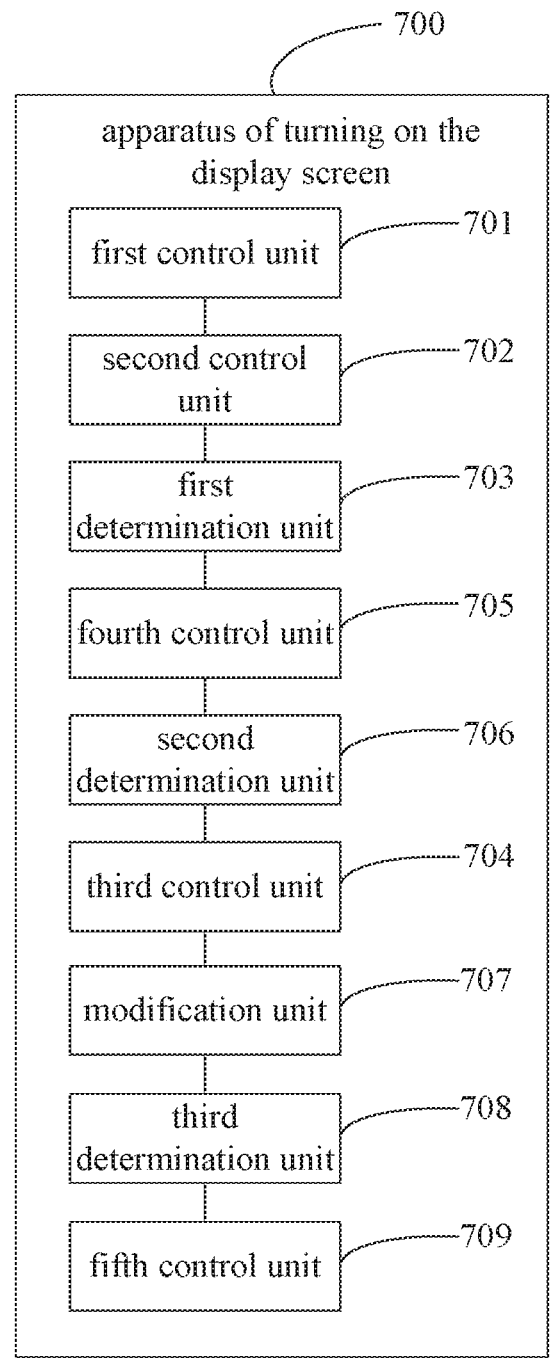
FIG. 13 is yet another illustrative structural diagram of the control apparatus of turning on the display screen according to still another embodiment of the present disclosure.

In embodiments, as shown in FIG. 13, the apparatus 700 of turning on the display screen further includes a modification unit 707, a third determination unit 708, and a fifth control unit 709.

The modification unit 707 is configured to modify the low threshold of the first signal receiver as a second low threshold, if the intensity of the reflection signal received by the first signal receiver is not greater than the first high threshold, where the second low threshold is less than the first high threshold.

The third determination unit 708 is configured to determine whether the intensity of the reflection signal received by the first signal receiver is less than the second low threshold.

The fifth control unit 709 controls the first signal receiver and the second signal receiver for receiving a reflection signal that is formed by reflecting the detection light off an external object again, if the intensity of the reflection signal received by the first signal receiver is less than the second low threshold.

When the second determination unit 706 determines that the intensity of the reflection signal received by the first signal receiver is not greater than (i.e., less than or equal to) the first high threshold, the modification unit 707 modifies a high threshold and a low threshold of the first signal receiver. The modified low threshold is a second low threshold. The modified low threshold is less than the first high threshold.

For example, when the second determination unit 706 determines that the intensity of the reflection signal received by the first signal receiver is not greater than the first high threshold, the modification unit 707 modifies the low threshold of the first signal receiver from zero to 60 and modifies the high threshold of the first signal receiver from 80 to 120.

Afterwards, the third determination unit 708 determines whether the intensity of the reflection signal received by the first signal receiver is less than the second low threshold. If the intensity of the reflection signal is less than the second low threshold, the fifth control unit 709 controls the first signal receiver and the second signal receiver that receive a reflection signal formed by reflecting the detection light off an external object again. The first determination unit 703 and the second determination unit 706 perform determination again after receiving the reflection signal.

Figure 14:
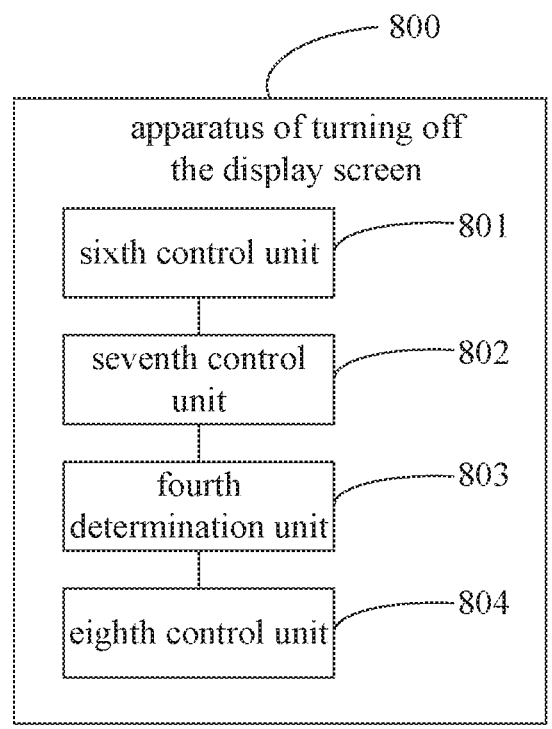
FIG. 14 is an illustrative structural diagram of a control apparatus of turning off the display screen according to one embodiment of the present disclosure.

As shown in FIG. 14, an apparatus of turning off the display screen includes a sixth control unit 801, a seventh control unit 802, a fourth determination unit 803, and an eighth control unit 804.

The sixth control unit 801 is configured to control the signal emitter that emits the detection signal outward when the display screen is in an on state.

The terminal includes the display screen. When the display screen of the terminal is in the on state, the terminal controls the signal emitter for emitting the detection signal outward. For example, in a communication process, the terminal is not close to the face of a user while the display screen of the terminal is in the on state, and the sixth control unit 801 controls the signal emitter to emit the detection signal outward.

The seventh control unit 802 is configured to control a second signal receiver that receives a reflection signal of the detection signal formed by an external object.

When the detection signal emitted by the signal emitter is in contact with the external object, the external object reflects the detection signal to form a reflection signal. The seventh control unit 802 controls the second signal receiver that continuously receives the reflection signal. The second signal receiver is a signal receiver which is away from the signal emitter.

The fourth determination unit 803 is configured to determine whether the intensity of the reflection signal that is received by the second signal receiver is greater than a second high threshold.

In one embodiment, a low threshold and a high threshold are set in the terminal for the second signal receiver. The high threshold is the second high threshold. The low threshold and the high threshold can be signal intensity values. Based on different types of the second signal receivers, the low threshold and the high threshold can be different. For example, when the second signal receiver is an 8-bit receiving chip, the low threshold is zero, and the high threshold is 100.

After the second signal receiver receives the reflection signal, the fourth determination unit 803 compares the received reflection signal intensity with the high threshold, so as to determine whether the intensity of the reflection signal is greater than the high threshold.

The eighth control unit 804 controls the display screen and turns off the display screen, if the intensity of the reflection signal that is received by the second signal receiver is greater than the second high threshold.

When the eighth control unit 804 determines that the intensity of the reflection signal received by the second signal receiver is greater than the high threshold, the terminal determines that the external object is close to the terminal. In other words, the terminal and the external are at a proximate state, so that the eighth control unit 804 controls the display screen of the terminal and turns off the display screen.

In one embodiment, the determination unit of an apparatus further includes a determination sub-unit, a decision sub-unit, and a control unit. The determination sub-unit is configured to determine whether the intensity of the reflection signal that is received by the second signal receiver is less than a first low threshold. The decision sub-unit is configured to determine that the distance state between the terminal and the object is at a distant state, if the intensity of the reflection signal that is received by the second signal receiver is less than the first low threshold. The control unit is configured to turn on the display screen based on the distant state.

The decision sub-unit further is configured to receive the reflection signal of the detection signal formed by the object, if the intensity of the reflection signal that is received by the second signal receiver is less than the first low threshold. The decision sub-unit further is configured to determine whether the intensity of the reflection signal received by the first signal receiver is greater than a first high threshold, wherein the first high threshold is greater than the first low threshold. The decision sub-unit further is configured to determine that the distance state between the terminal and the object is at the distant state, wherein the distant state defines that the intensity of the reflection signal received by the first signal receiver is greater than the first high threshold.

The decision sub-unit further is configured to modify a low threshold of the first signal receiver to a second low threshold, if the intensity of the reflection signal that is received by the first signal receiver is not greater than the first high threshold, wherein the second low threshold is less than the first high threshold. The decision sub-unit further is configured to determine whether the intensity of the reflection signal received by the first signal receiver is less than the second low threshold. The decision sub-unit further is configured to receive the reflection signal of the detection signal formed by the object once again, if the intensity of the reflection signal received by the first signal receiver is less than the second low threshold.

In one embodiment, the apparatus further includes that the determination sub-unit is configured to determine whether the intensity of the reflection signal that is received by the second signal receiver is greater than a second high threshold. The apparatus further includes that the decision sub-unit is configured to determine that the distance state between the terminal and the object is at a proximate state, if the intensity of the reflection signal is greater than the second high threshold. The apparatus further includes that the control unit is configured to turn on the display screen based on the proximate state. A distance between the second signal receiver and the signal emitter is greater than a distance between the first signal receiver and the signal emitter.

In the description of the present disclosure, reference is made to the term "one embodiment", "certain embodiments", "exemplary embodiments", "some embodiments", "examples", "specific examples", or "some examples" and the like, and are intended to refer to specific features described in connection with the embodiments or examples, structure, material or characteristic that is included in at least one embodiment or example of the present disclosure. In the present disclosure, the schematic expressions of the terms are not necessarily referring to the same embodiment or example. Moreover, the described specific features, structures, materials, or features may be combined in any suitable manner in any one or more embodiments or examples of the present disclosure. The actions of the method disclosed by the embodiments of present disclosure can be embodied directly as a hardware decoding processor can be directly executed by a hardware decoding processor, or by combinations of hardware and software codes in a decoding processor. The software codes can be stored in a storage medium selected from one group consisting of random access memory, a flash memory, a read-only memory, a programmable read-only memory, an electrically erasable programmable read-only memory, and registers. The processor read information (e.g., instructions) in the memory and completes the above-mentioned actions of the method in combination with hardware.

As is understood by a person skilled in the art, the foregoing preferred embodiments of the present disclosure are illustrative rather than limiting of the present disclosure. It is intended that they cover various modifications and similar arrangements be included within the spirit and scope of the present disclosure, the scope of which should be accorded the broadest interpretation so as to encompass all such modifications and similar structures.

What is claimed is:

1. A method of controlling display screen states of a terminal, wherein the terminal comprises a display screen, a signal emitter, a first signal receiver, and a second signal receiver, and wherein a distance between the second signal receiver and the signal emitter is greater than a distance between the first signal receiver and the signal emitter, the method comprising:
   emitting, by the signal emitter, a detection signal;
   receiving, by the second signal receiver, a reflection signal of the detection signal formed by an object;
   determining a distance state between the terminal and the object based on intensity of the reflection signal that is received by the second signal receiver, comprising:
      determining whether the intensity of the reflection signal that is received by the second signal receiver is less than a first low threshold;
      receiving, by the first signal receiver, the reflection signal of the detection signal formed by the object, if the intensity of the reflection signal that is received by the second signal receiver is less than the first low threshold;
      determining whether the intensity of the reflection signal received by the first signal receiver is greater than a first high threshold, wherein the first high threshold is greater than the first low threshold; and
      determining that the distance state between the terminal and the object is at a distant state, if the intensity of the reflection signal received by the first signal receiver is greater than the first high threshold; wherein the distant state defines that the intensity of the reflection signal is less than the first low threshold; and
   controlling the display screen states based on the distance state, comprising:
      turning on the display screen based on the distant state.

2. The method of controlling display screen states according to claim 1, wherein if the intensity of the reflection signal is less than the first low threshold, determining that the distance state between the terminal and the object is at the distant state further comprises:
   modifying a low threshold of the first signal receiver to a second low threshold, if the intensity of the reflection signal that is received by the first signal receiver is not greater than the first high threshold, wherein the second low threshold is less than the first high threshold;
   determining whether the intensity of the reflection signal received by the first signal receiver is less than the second low threshold; and
   receiving, by the first signal receiver and the second signal receiver, the reflection signal of the detection signal formed by the object once again, if the intensity of the reflection signal received by the first signal receiver is less than the second low threshold.

3. The method of controlling display screen states according to claim 1, wherein determining the distance state between the terminal and the object based on the intensity of the reflection signal that is received by the second signal receiver comprises:
   determining whether the intensity of the reflection signal that is received by the second signal receiver is greater than a second high threshold; and
   determining that the distance state between the terminal and the object is at a proximate state, wherein the proximate state defines that the intensity of the reflection signal is greater than the second high threshold;
   wherein controlling the display screen states based on the distance states comprises:
      turning on the display screen based on the proximate state.

4. An apparatus for controlling display screen states of a terminal, wherein the terminal comprises a display screen and a first signal receiver, the apparatus comprising:
   a signal emitter configured to emit a detection signal;
   a second signal receiver configured to receive a reflection signal of the detection signal formed by an object;
   a determination unit configured to determine a distance state between the terminal and the object based on intensity of the reflection signal that is received by the second signal receiver, wherein the determination unit comprises:
  a determination sub-unit configured to determine whether the intensity of the reflection signal that is received by the second signal receiver is less than a first low threshold;
  a decision sub-unit configured to receive the reflection signal of the detection signal formed by the object, if the intensity of the reflection signal that is received by the second signal receiver is less than the first low threshold; determine whether the intensity of the reflection signal received by the first signal receiver is greater than a first high threshold, wherein the first high threshold is greater than the first low threshold; and determine that the distance state between the terminal and the object is at a distant state, if the intensity of the reflection signal received by the first signal receiver is greater than the first high threshold, wherein the distant state defines that the intensity of the reflection signal received by the first signal receiver is greater than the first high threshold; and
  a control unit configured to control the display screen states based on the distance state, wherein the control unit is configured to turn on the display screen based on the distant state.

5. The apparatus according to claim 4, wherein the decision sub-unit further is configured to:
  modify a low threshold of the first signal receiver to a second low threshold, if the intensity of the reflection signal that is received by the first signal receiver is not greater than the first high threshold, wherein the second low threshold is less than the first high threshold;
  determine whether the intensity of the reflection signal received by the first signal receiver is less than the second low threshold; and
  receive the reflection signal of the detection signal formed by the object once again, if the intensity of the reflection signal received by the first signal receiver is less than the second low threshold.

6. The apparatus according to claim 4, further comprising:
  the determination sub-unit configured to determine whether the intensity of the reflection signal that is received by the second signal receiver is greater than a second high threshold;
  the decision sub-unit configured to determine that the distance state between the terminal and the object is at a proximate state, if the intensity of the reflection signal is greater than the second high threshold; and
  the control unit configured to turn on the display screen based on the proximate state.

7. The apparatus according to claim 4, wherein a distance between the second signal receiver and the signal emitter is greater than a distance between the first signal receiver and the signal emitter.

8. A terminal device, comprising:
  a display screen;
  a first signal receiver configured to receive a reflection signal of a detection signal formed by an object;
  a signal emitter configured to emit a detection signal;
  a second signal receiver configured to receive the reflection signal of the detection signal formed by the object;
  a determination unit configured to determine the distance state between the terminal and the object based on intensity of the reflection signal that is received by the second signal receiver, wherein the determination unit comprises:
    a determination sub-unit configured to determine whether the intensity of the reflection signal that is received by the second signal receiver is less than a first low threshold;
    a decision sub-unit configured to receive the reflection signal of the detection signal formed by the object, if the intensity of the reflection signal that is received by the second signal receiver is less than the first low threshold; determine whether the intensity of the reflection signal received by the first signal receiver is greater than a first high threshold, wherein the first high threshold is greater than the first low threshold; and determine that the distance state between the terminal and the object is at a distant state, if the intensity of the reflection signal received by the first signal receiver is greater than the first high threshold, wherein the distant state defines that the intensity of the reflection signal received by the first signal receiver is greater than the first high threshold; and
  a control unit configured to control display screen states based on the distance state, wherein the control unit is configured to turn on the display screen based on the distant state.

9. The terminal device according to claim 8, wherein the decision sub-unit further is configured to:
  modify a low threshold of the first signal receiver to a second low threshold, if the intensity of the reflection signal that is received by the first signal receiver is not greater than the first high threshold, wherein the second low threshold is less than the first high threshold;
  determine whether the intensity of the reflection signal received by the first signal receiver is less than the second low threshold; and
  receive the reflection signal of the detection signal formed by the object once again, if the intensity of the reflection signal received by the first signal receiver is less than the second low threshold.

10. The terminal device according to claim 8, further comprising:
  the determination sub-unit configured to determine whether the intensity of the reflection signal that is received by the second signal receiver is greater than a second high threshold;
  the decision sub-unit configured to determine that the distance state between the terminal and the object is at a proximate state, wherein the proximate state defines that the intensity of the reflection signal is greater than the second high threshold; and
  the control unit configured to turn on the display screen based on the proximate state.

11. The terminal device according to claim 8, wherein a distance between the second signal receiver and the signal emitter is greater than a distance between the first signal receiver and the signal emitter.

* * * * *